(12) United States Patent
Sutton

(10) Patent No.: US 10,011,058 B2
(45) Date of Patent: Jul. 3, 2018

(54) DUAL FIRMNESS HEAD RESTRAINT

(75) Inventor: Jeremy Sutton, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 819 days.

(21) Appl. No.: 13/305,351

(22) Filed: Nov. 28, 2011

(65) Prior Publication Data

US 2013/0134760 A1 May 30, 2013

(51) Int. Cl.
| | |
|---|---|
| *B29C 44/04* | (2006.01) |
| *B29C 45/16* | (2006.01) |
| *B60N 2/70* | (2006.01) |
| *B60N 2/80* | (2018.01) |
| *B29L 31/30* | (2006.01) |

(52) U.S. Cl.
CPC ...... *B29C 44/0461* (2013.01); *B29C 44/0492* (2013.01); *B29C 45/1671* (2013.01); *B29C 45/1676* (2013.01); *B60N 2/7017* (2013.01); *B60N 2/80* (2018.02); *B29L 2031/3023* (2013.01)

(58) Field of Classification Search
CPC ........... B60N 2/4885; B60N 2/7017; B29C 44/0461; B29C 44/0492; B29C 45/1671; B29C 45/1676
USPC ......... 297/391, 408, 452.27, 452.37, 216.12; 264/46.5
See application file for complete search history.

(56) References Cited

U.S. PATENT DOCUMENTS

| | | | | |
|---|---|---|---|---|
| 3,205,005 | A * | 9/1965 | Brown | 297/397 |
| 3,264,382 | A * | 8/1966 | Angell et al. | 264/46.4 |
| 3,328,082 | A * | 6/1967 | Lilleso | 297/399 |
| 3,366,417 | A * | 1/1968 | Belk | 297/397 |
| 3,648,308 | A * | 3/1972 | Greenawalt | 5/632 |
| 3,650,561 | A * | 3/1972 | Faust et al. | 297/391 |
| 3,888,540 | A * | 6/1975 | Protze et al. | 297/486 |
| 3,918,863 | A * | 11/1975 | Rhodes, Jr. | 425/117 |
| 4,030,781 | A * | 6/1977 | Howard | 297/397 |
| 4,190,697 | A * | 2/1980 | Ahrens | 428/309.9 |
| 4,350,734 | A | 9/1982 | Hammond | |
| 4,443,286 | A | 4/1984 | Ikeda et al. | |
| 4,744,601 | A * | 5/1988 | Nakanishi | 297/391 |
| 4,756,551 | A * | 7/1988 | Miller | 280/751 |
| 4,758,047 | A * | 7/1988 | Hennington | 297/397 |
| 4,779,929 | A * | 10/1988 | Kuchemann | 297/408 |

(Continued)

FOREIGN PATENT DOCUMENTS

| | | |
|---|---|---|
| CN | 201646462 U | 11/2010 |
| JP | 9066533 A | 3/1997 |

(Continued)

OTHER PUBLICATIONS

Chinese Office Action dated Jan. 25, 2016, from the State Intellectual Property Office of P.R.C. for Application No. 201210468921.1, filed on Nov. 19, 2012, entitled "Dual Firmness Head Restraint", 12 pages.

*Primary Examiner* — Anthony D Barfield
(74) *Attorney, Agent, or Firm* — Vichit Chea; Price Heneveld LLP

(57) ABSTRACT

A method of making a vehicle headrest restraint and connecting first and second molds to form a mold cavity. A first material is injected with a first density into the mold cavity. A second material is injected with a second density into the mold cavity. The first and second materials are cooled to develop an integrally formed headrest.

10 Claims, 5 Drawing Sheets

(56) References Cited

U.S. PATENT DOCUMENTS

| | | | |
|---|---|---|---|
| 4,828,287 A * | 5/1989 | Siler | 280/751 |
| 4,837,881 A * | 6/1989 | Kondo et al. | 5/653 |
| 4,865,388 A * | 9/1989 | Nemoto | 297/403 |
| 4,890,885 A * | 1/1990 | Grossmann | 297/284.1 |
| 4,923,746 A * | 5/1990 | Balmisse et al. | 428/309.9 |
| 5,015,036 A * | 5/1991 | Fergie | 297/397 |
| 5,061,419 A * | 10/1991 | Kouda et al. | 264/46.6 |
| 5,089,191 A * | 2/1992 | Hughes | 264/46.5 |
| 5,096,639 A * | 3/1992 | Hughes | 264/46.5 |
| 5,132,063 A * | 7/1992 | Hughes | 264/46.4 |
| 5,139,310 A * | 8/1992 | Itoh | 297/391 |
| 5,244,612 A * | 9/1993 | Iwasawa et al. | 264/46.5 |
| 5,400,490 A * | 3/1995 | Burchi | 29/91.1 |
| 5,405,190 A * | 4/1995 | Jeffcoat et al. | 297/391 |
| 5,482,355 A * | 1/1996 | Franzen, Jr. | 297/410 |
| 5,542,747 A * | 8/1996 | Burchi | 297/452.55 |
| 5,633,286 A * | 5/1997 | Chen | 524/474 |
| 5,649,721 A * | 7/1997 | Stafford et al. | 280/751 |
| 5,681,087 A * | 10/1997 | Yamano et al. | 297/391 |
| 5,695,252 A * | 12/1997 | Schmidt et al. | 297/408 |
| 5,711,579 A * | 1/1998 | Albrecht | 297/410 |
| 5,730,917 A * | 3/1998 | Ishikawa et al. | 264/46.5 |
| 5,769,489 A * | 6/1998 | Dellanno | 297/216.14 |
| 5,772,280 A * | 6/1998 | Massara | 297/216.12 |
| 5,827,546 A * | 10/1998 | Burchi et al. | 425/116 |
| 5,882,073 A * | 3/1999 | Burchi et al. | 297/218.2 |
| 5,961,182 A * | 10/1999 | Dellanno | 297/216.12 |
| 5,989,699 A * | 11/1999 | Kuczynski et al. | 428/316.6 |
| 6,068,337 A * | 5/2000 | De Filippo | 297/391 |
| 6,120,100 A * | 9/2000 | Palazzolo et al. | 297/391 |
| 6,200,506 B1 * | 3/2001 | Takei | 264/46.6 |
| 6,213,548 B1 * | 4/2001 | Van Wynsberghe et al. | 297/216.12 |
| 6,623,675 B2 * | 9/2003 | Kobayashi et al. | 264/46.4 |
| 6,755,475 B1 * | 6/2004 | Tiesler et al. | 297/452.26 |
| 6,805,404 B1 * | 10/2004 | Breed | 297/216.12 |
| 6,824,211 B2 * | 11/2004 | Bayer et al. | 297/216.12 |
| 6,874,854 B2 * | 4/2005 | Terrand et al. | 297/410 |
| 7,090,292 B2 * | 8/2006 | Dellanno | 297/216.12 |
| 7,213,884 B2 | 5/2007 | Flory et al. | |
| 7,588,115 B2 * | 9/2009 | Breed | 180/271 |
| 7,621,598 B2 * | 11/2009 | Humer et al. | 297/410 |
| 2002/0060482 A1 * | 5/2002 | Sakakibara et al. | 297/216.12 |
| 2003/0173811 A1 * | 9/2003 | Pausch | 297/391 |
| 2004/0036329 A1 * | 2/2004 | Ashton et al. | 297/220 |
| 2005/0088019 A1 * | 4/2005 | Myslowski | 297/216.12 |
| 2005/0110181 A1 * | 5/2005 | Ingwersen et al. | 264/46.5 |
| 2005/0127734 A1 * | 6/2005 | Veine et al. | 297/391 |
| 2006/0103195 A1 * | 5/2006 | Stanley | 297/220 |
| 2006/0214491 A1 * | 9/2006 | Metz et al. | 297/410 |
| 2006/0273650 A1 * | 12/2006 | Embach | 297/452.27 |
| 2008/0164730 A1 | 7/2008 | Watson et al. | |
| 2009/0146472 A1 * | 6/2009 | Galbreath et al. | 297/216.1 |
| 2009/0315372 A1 * | 12/2009 | Tracht | 297/216.12 |
| 2011/0187173 A1 * | 8/2011 | Janz et al. | 297/391 |
| 2013/0076086 A1 * | 3/2013 | Pickett et al. | 297/216.12 |
| 2013/0278027 A1 * | 10/2013 | Brucato | 297/216.12 |

FOREIGN PATENT DOCUMENTS

| | | |
|---|---|---|
| JP | 200296341 A | 4/2002 |
| JP | 2002120237 A | 4/2002 |
| JP | 2006142937 A | 6/2006 |
| JP | 2008113928 A | 5/2008 |

* cited by examiner

DUAL FIRMNESS HEAD RESTRAINT

FIELD OF THE INVENTION

The present invention generally relates to vehicle head restraints, and more particularly relates to a vehicle head restraint with dual firmness.

BACKGROUND OF THE INVENTION

Automotive vehicle seats frequently include a head restraint positioned at an upper edge of a seat back. The head restraints are designed to provide comfort and safety to passengers. In the occurrence of a rear impact collision event, the head restraint limits the rearward movement of the occupant's head, thereby minimizing the risk of injury to the occupant's neck.

SUMMARY OF THE INVENTION

According to one aspect of the present invention, a method of making a vehicle headrest restraint and connecting first and second molds to form a mold cavity. A first material is injected with a first density into the mold cavity. A second material is injected with a second density into the mold cavity. The first and second materials are cooled to develop an integrally formed headrest.

According to another aspect of the present invention, a headrest restraint includes an integrally molded headrest having a forward flexible portion adapted to support the head of a passenger and absorb impact forces during a collision event. A rearward stiff portion is adapted to support the forward flexible portion and provide sufficient strength to withstand impact forces from the head of a passenger during a collision event. The forward flexible portion and the rearward stiff portion are simultaneously injection molded into a single mold cavity. First and second headrest supports are extended downwardly from the rearward stiff portion and are adapted to interface with a vehicle seat assembly.

According to yet another aspect of the present invention, a vehicle headrest restraint includes a dual-density molded headrest having a forward flexible portion adapted to support the head of a passenger. A rearward stiff portion is integrally formed with the forward flexible portion and is adapted to support the forward flexible portion. First and second headrest supports extend downwardly from the rearward stiff portion and are adapted to interface with a vehicle seat back.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is a cross-sectional elevational view taken at IVA-IVA of FIG. 4 of a first material being poured into a cavity;

FIG. 4B is a cross-sectional elevational view of a second material being poured into a cavity;

DETAILED DESCRIPTION OF EMBODIMENTS

Figure 1:
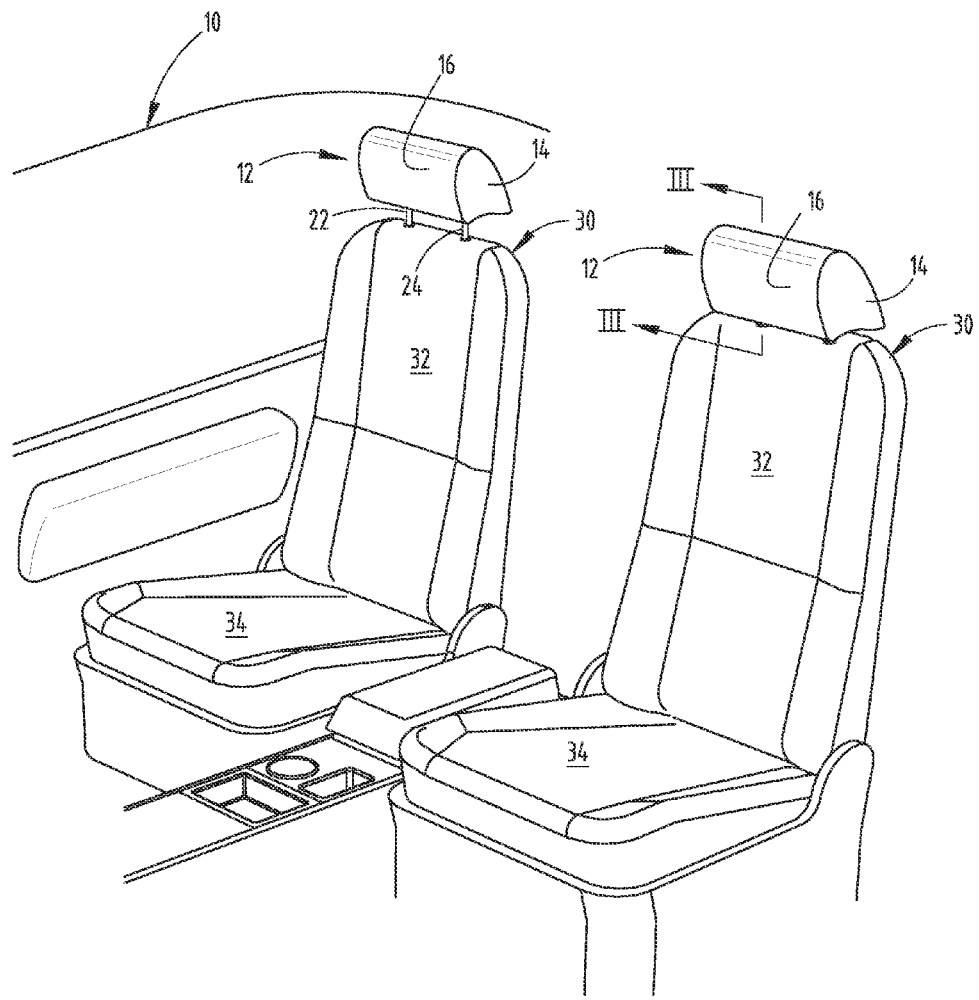
FIG. 1 is a front perspective view of one embodiment of a vehicle headrest restraint of the present invention.

For purposes of description herein, the terms "upper," "lower," "right," "left," "rear," "front," "vertical," "horizontal," "inboard," "outboard," and derivatives thereof shall relate to the vehicle as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6, the reference numeral 10 generally designates a vehicle having a headrest restraint 12 that includes an integrally molded headrest 14 having a forward flexible portion 16 adapted to support the head of a passenger and absorb impact forces during a collision event. A rearward stiff portion 18 is adapted to support the forward flexible portion 16 and provide sufficient strength to withstand impact forces from the head of a passenger during a collision event, the forward flexible portion 16 and the rearward stiff portion 18 being simultaneously injection molded into a single mold cavity 20. First and second headrest supports 22, 24 extend downwardly from the rearward stiff portion 18 and are adapted to interface with a vehicle seat assembly 30.

Referring again to FIG. 1, the headrest restraint 12 is generally designed for use on the vehicle seat assembly 30 to provide support to the head of a passenger being transported in the vehicle 10. The headrest restraint 12 is connected to the vehicle seat assembly 30, and more specifically, to a vehicle seat back 32 by the first and second headrest supports 22, 24. The vehicle seat back 32 includes apertures 33 adapted to receive the first and second headrest supports 22, 24, thereby supporting the headrest restraint 12. The vehicle seat assembly 30 also includes a seat 34 disposed below the vehicle seat back 32.

Figure 2:
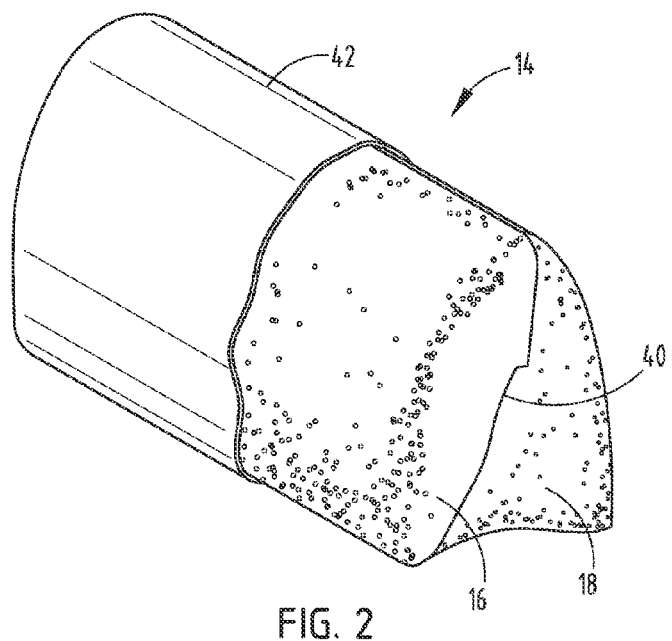
FIG. 2 is a front perspective view of a forward flexible portion of the vehicle headrest restraint of FIG. 1.
Figure 3:
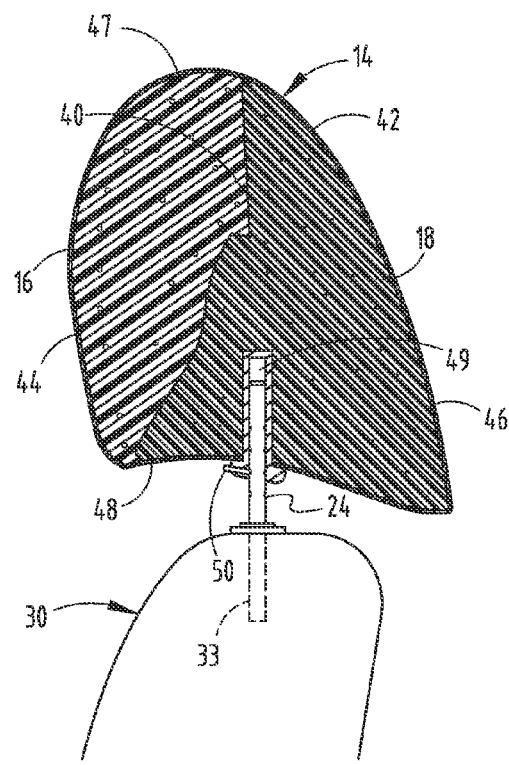
FIG. 3 is a side cross-sectional view taken at III-III of FIG. 1 of a rearward stiff portion of the vehicle headrest restraint.

Referring now to the embodiment generally illustrated in FIGS. 2 and 3, the forward flexible portion 16 and the rearward stiff portion 18 are generally separated by a parting line 40. The entire headrest restraint 12 is covered by a trim layer 42 that protects the headrest 14 and provides an aesthetic appearance to the headrest restraint 12. Notably, the forward flexible portion 16 and the rearward stiff portion 18 are integrally connected, such that adhesives, or fasteners, are unnecessary to maintain the fixed connection between the forward flexible portion 16 and the rearward stiff portion 18. The integral connection of the forward flexible portion 16 and the rearward stiff portion 18 is developed during the forming of the headrest restraint 12, as explained in greater detail below. It is generally contemplated that the parting line 40 can be disposed at any position between a front portion 44 of the headrest restraint 12 and a back portion 46 of the headrest restraint 12. To increase the cushion size of the headrest restraint 12, the size of the forward flexible portion 16 is increased. To increase the structure stability of the headrest restraint 12 generally, the size of the rearward stiff portion 18 is increased. In the illustrated embodiment shown in FIG. 3, the forward flexible portion 16 extends from a top portion 47 of the headrest restraint 12 to a bottom portion 48 of the headrest restraint 12. The forward flexible portion 16 is generally designed to absorb impact forces during a collision event, while at the same time, provide comfort to a passenger that wishes to rest his or her head on the headrest restraint 12.

Referring again to FIGS. 2 and 3, the rearward stiff portion 18 extends from the top portion 47 of the headrest restraint 12 down to the bottom portion 48 of the headrest restraint 12. The rearward stiff portion 18 is designed to provide sufficient structural strength to the headrest restraint 12 to prevent the head of a passenger from extending too far back during a forward collision event. The rearward stiff portion 18 includes at least two slots 49, each of which is adapted to receive a support sleeve 50 that is, in turn, adapted to receive and secure each of the first and second headrest supports 22, 24. It is contemplated that the first and second headrest supports 22, 24 may be inserted into the mold cavity 20 at the time of manufacturing of the headrest restraint 12, such that the first and second headrest supports 22, 24 are integrally connected with the headrest restraint 12. The headrest restraint 12 is designed for vertical translation above the vehicle seat assembly 30. To accomplish this, the first and second headrest supports 22, 24 are designed to slide into and out of the apertures 33 of the vehicle seat back 32. The first and second headrest supports 22, 24 are designed to withstand sufficient impact forces during a collision event. Likewise, the rearward stiff portion 18 is also designed to withstand sufficient impact forces to protect the head of a passenger during a collision event.

Figure 4:
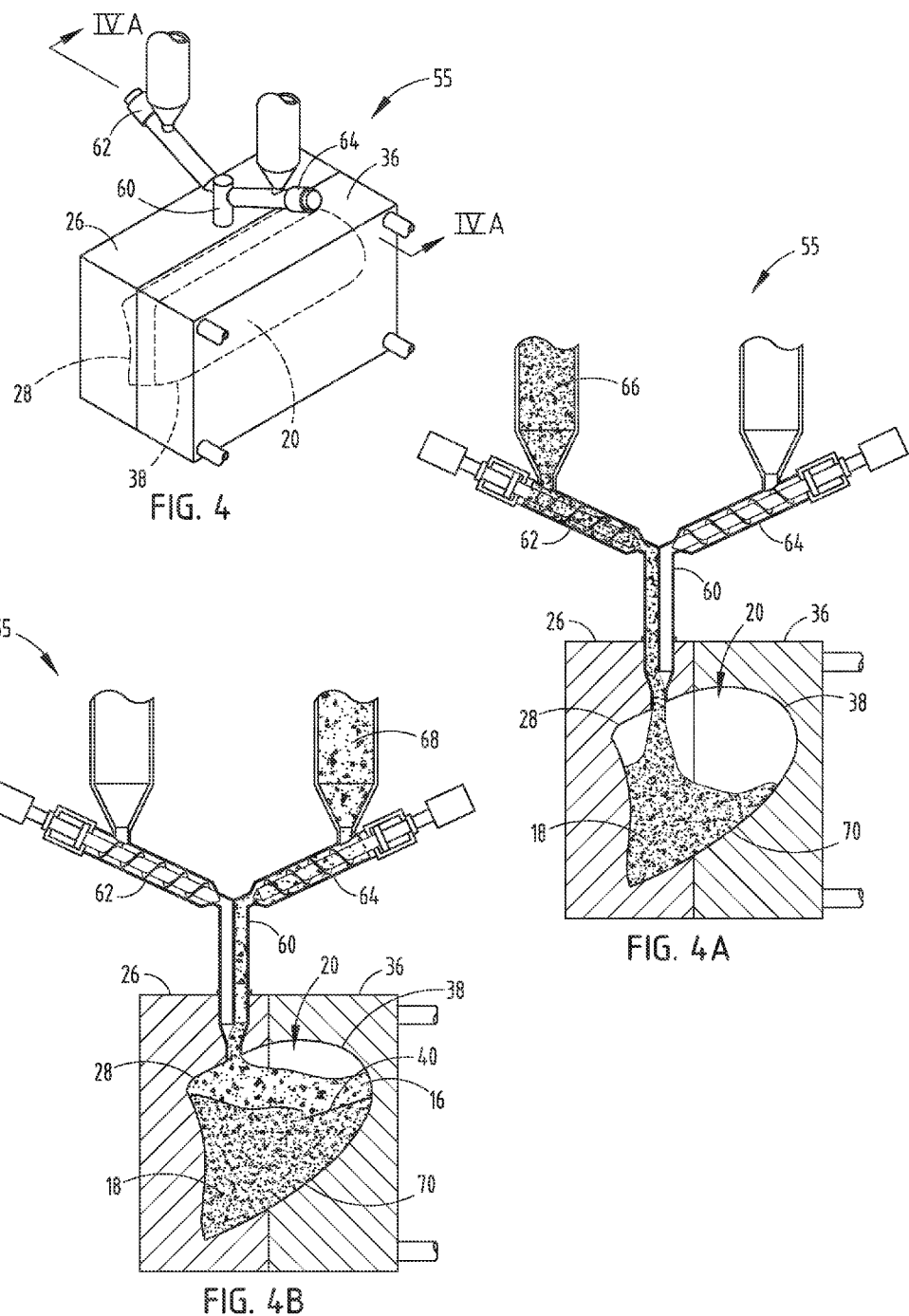
FIG. 4 is a bottom perspective view of the vehicle headrest of FIG. 2.
Figure 5:
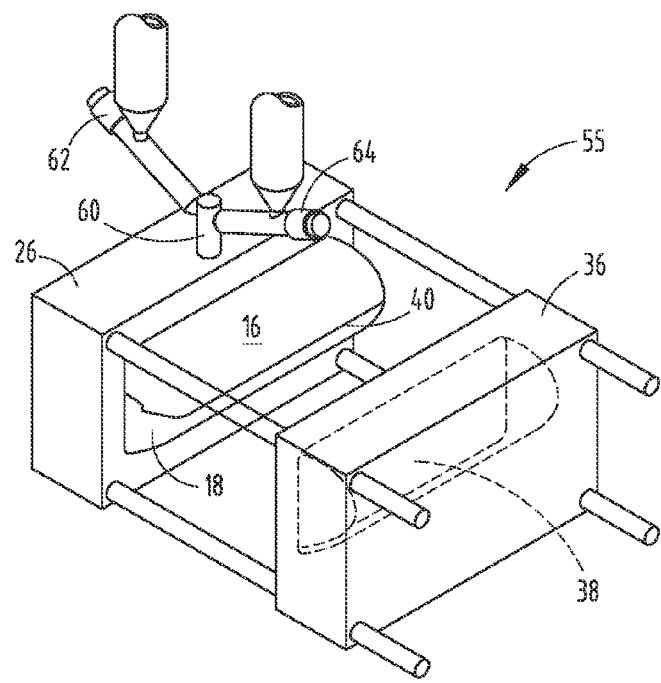
FIG. 5 is a bottom exploded perspective view of the vehicle headrest of FIG. 4.
Figure 6:
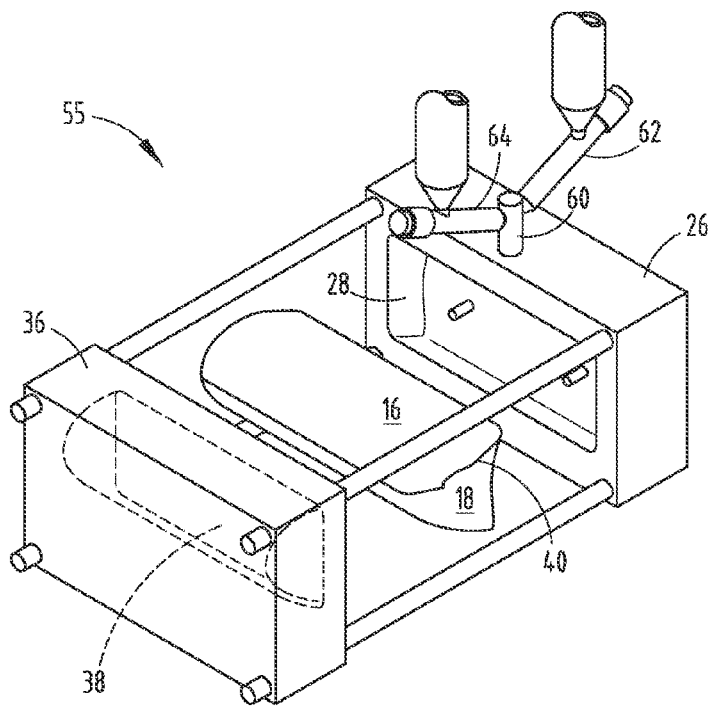
FIG. 6 is a bottom side exploded perspective view of the vehicle headrest of FIG. 5.

Referring now to FIGS. 4-6, one embodiment of a method of producing the headrest restraint 12 includes a molding assembly 55 having a first mold 26 and a second mold 36 that together define the mold cavity 20. More specifically, the first mold 26 and the second mold 36 include partial cavities 28, 38, respectively that together define the mold cavity 20. An injection blade 60 is extended into one of the first and second molds 26, 36. The injection blade 60 includes first and second pour channels 62, 64. The first pour channel 62 is adapted to provide a first material 66 to the mold cavity 20. The second pour channel 64 is designed to provide a second material 68 having a different density than the first material 66 to the mold cavity 20. After injection of the first and second materials 66, 68 into the mold cavity 20, the first and second materials 66, 68 are allowed to cool to develop the integrally formed headrest restraint 12. It will be generally understood that the first material 66 may include a first density that is higher than the density of the second material 68. It will also be understood that the first and second materials 66, 68 may cure as a foam-like substrate inside the mold cavity 20. Accordingly, the first material 66 settles at a bottom portion 70 of the mold cavity 20 and includes the rearward stiff portion 18. Consequently, the integrally formed headrest restraint 12 can be created without requiring third and fourth mold cavities typically used in multi-shot injection molding processes. Thus, the headrest restraint 12 can be formed using a one-shot injection molding process, as explained above.

Figure 7A:
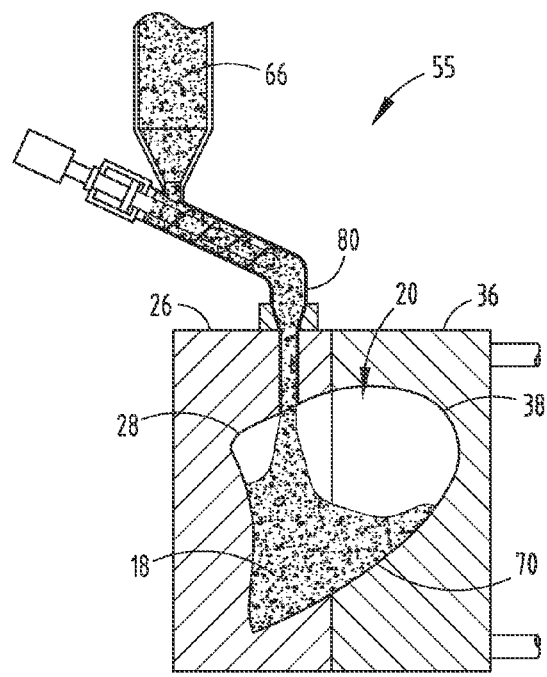
FIG. 7A is a cross-sectional elevational view of a first injection port extended into a mold cavity.
Figure 7B:
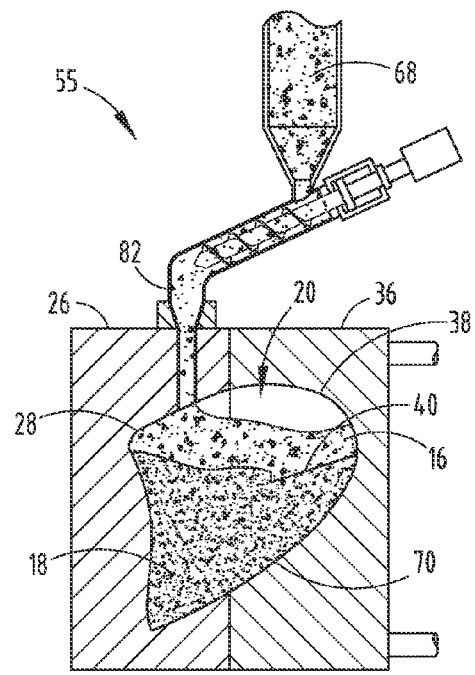
FIG. 7B is a cross-sectional elevational view of a second injection port extended into a mold cavity.

Referring now to the embodiment illustrated in FIGS. 7A and 7B, it is contemplated that the headrest restraint 12 can be constructed utilizing a dual-pass injection molding process. More specifically, a first injection port 80 is extended into the mold cavity 20. The first injection port 80 then injects the first material 66 into the mold cavity 20. Subsequently, a second injection port 82 is inserted into the mold cavity 20. The second injection port 82 is used to inject the second material 68 into the mold cavity 20. The first and second materials 66, 68 are then allowed to cure, after which time the mold cavity 20 is opened and the formed headrest restraint 12 is removed.

Notably, in both the embodiments illustrated in FIGS. 4-6, as well as FIGS. 7A and 7B, the headrest restraint 12 is integrally formed such that the first and second materials 66, 68 form a single headrest. Thus, the need for glues, adhesives, or fasteners is eliminated. The method of manufacturing the headrest restraint 12, as well as the headrest restraint 12 itself, eliminates many costs typically associated with headrest restraint production. For example, items traditionally provided in headrest restraints, such as a traditional core and topper pad, are unnecessary.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A headrest restraint comprising:
   a single-piece molded headrest comprising:
      a forward flexible foam portion adapted to support the head of a passenger and absorb impact forces during a collision event and extending between an upper edge and a lower edge thereof; and
      a rearward stiff foam portion being directly connected with the forward flexible foam portion along an entirety of an integral parting line therebetween that extends from the upper edge of the forward flexible portion to the lower edge thereof; and
   first and second headrest supports separately coupled with and extending downwardly from the rearward stiff portion and adapted to interface with a vehicle seat assembly, the rearward stiff portion alone supporting the forward flexible portion with respect to the first and second headrest supports.

2. The headrest restraint of claim 1, wherein the first and second headrest supports are fixedly connected directly to the rearward stiff foam portion.

3. The headrest restraint of claim 1, wherein the first and second headrest supports are removably connected with sleeves separately integrally bonded in the rearward stiff foam portion.

4. The headrest restraint of claim 1, comprising:
   a trim layer disposed over the entire headrest restraint, including both the forward flexible foam portion and the rearward stiff foam portion.

5. The headrest restraint of claim 1, wherein the forward flexible foam portion and the rearward stiff foam portion form a single, dual-density foam substrate.

6. A vehicle headrest restraint comprising:
   a single-piece molded headrest comprising:
      a forward flexible foam portion defining opposite upper and lower edges; and a rearward stiff foam portion being directly connected with the forward flexible foam portion along an entirety of an integral parting line therebetween that extends from the upper edge of the forward flexible portion to the lower edge thereof; and a first headrest support extending from the rearward stiff foam portion, the rearward stiff foam portion alone supporting the forward flexible foam portion on the first headrest support.

7. The headrest restraint of claim 6, further including a second headrest support extending from the rearward stiff foam portion, wherein the first and second headrest supports are separately fixedly connected directly to the rearward stiff foam portion.

8. The headrest restraint of claim 6, wherein the first headrest support is removably connected with a sleeve separately integrally bonded in the rearward stiff foam portion.

9. The headrest restraint of claim 6, further comprising:

a trim layer disposed over the entire headrest restraint, including both the forward flexible foam portion and the rearward stiff foam portion.

10. The headrest restraint of claim 6, wherein the forward flexible portion and the rearward stiff portion form a dual-density foam substrate.

* * * * *